United States Patent
Takekawa

Patent Number: 6,091,376
Date of Patent: Jul. 18, 2000

[54] MOBILE TELEPHONE EQUIPMENT WITH HEAD-UP DISPLAY

[75] Inventor: Yasuhisa Takekawa, Tokyo, Japan

[73] Assignee: NEC Corporation, Tokyo, Japan

[21] Appl. No.: 08/414,112

[22] Filed: Mar. 31, 1995

[30] Foreign Application Priority Data

May 13, 1994 [JP] Japan .................................. 6-099792

[51] Int. Cl.[7] .................................................. G09G 5/00
[52] U.S. Cl. ...................................................... 345/7; 345/7
[58] Field of Search ........................ 345/7–9, 173; 359/630; 379/110

[56] References Cited

U.S. PATENT DOCUMENTS

| | | |
|---|---|---|
| 3,956,745 | 5/1976 | Ellis . |
| 4,818,048 | 4/1989 | Moss ........................................... 345/7 |
| 5,028,119 | 7/1991 | Hegg et al. ............................. 350/174 |

FOREIGN PATENT DOCUMENTS

| | | |
|---|---|---|
| 0123562 | 10/1984 | European Pat. Off. . |
| 0476856 | 3/1992 | European Pat. Off. . |
| 4267288 | 9/1992 | Japan .................................. G09F 9/00 |
| WO-9003590 | 4/1990 | WIPO . |

*Primary Examiner*—Kent Chang
*Attorney, Agent, or Firm*—Sughrue, Mion, Zinn, Macpeak & Seas, PLLC

[57] ABSTRACT

A mobile telephone equipment for use in an automobile having a front windshield includes an antenna for transmitting and receiving radio waves, a main unit having a transmitter, a receiver, and a first controller, said transmitter and said receiver being connected to said antenna; a handset having a speaker, a microphone, and a second controller, said second controller being connected to said speaker, said microphone, and said first controller; and a display unit having a head-up display for displaying communications information and telephone push buttons in a superimposed relation to a front view outside of the front windshield. The mobile telephone equipment also includes a touch panel formed on the front windshield in a pattern corresponding to the telephone push buttons which are displayed in superimposed relation to the front view outside of the front windshield by said head-up display.

7 Claims, 4 Drawing Sheets

MOBILE TELEPHONE EQUIPMENT WITH HEAD-UP DISPLAY

BACKGROUND OF THE INVENTION

The present invention relates to a mobile telephone equipment having a head-up display as a display means for displaying communications information, and more particularly to a mobile telephone equipment which has a touch panel formed on a front windshield in a manner to correspond to displayed telephone push buttons.

Conventional mobile telephone equipments have either no display means for displaying communications information or use simple liquid-crystal display means or the like on a main telephone unit or a handset for displaying communications information.

FIG. 4 of the accompanying drawings shows a typical handset for use with a conventional mobile telephone equipment. The handset shown in FIG. 4, denoted at 62, has a liquid crystal display panel 64 for displaying communications information such as the telephone number of a party to which the telephone device is being connected, and the period of time during which the call is being made, or calendar information such as date, time, etc. The handset 62 also has push buttons 66 including a dial.

Since the liquid crystal display panel 64 is disposed on the handset 62, the display area of the liquid crystal display panel 64 is limited, i.e., it is not wide enough to display a sufficient amount of information with high visibility. When the driver of the automobile uses the handset 62 while driving the automobile, the driver has to turn his eyes from the front view. To make a call from the handset 62, the driver has to take the handset 62 and look at the push buttons 66, and hence has to turn his eyes from the front view. Consequently, using the handset 62 or making a call from the handset 62 while driving the automobile is quite dangerous. Use of the handset 62 to place a call at night while driving the automobile is particularly dangerous because the driver's compartment is dark, making the push buttons 66 less visible and causing the driver to take more time to make the call than during the daytime.

Some recent automobiles have a head-up display device for displaying information such as an automobile speed, a distance traveled, the time, and so on within a front field of view outside of the front windshield, so that the driver can see the displayed information in a superimposed relation to the actual front view. One known head-up display device, for example, is disclosed in Japanese patent laid-open No. 267288/92. The head-up display device allows the driver to see displayed information outside of the front windshield without turning his eyes from the front field of view.

SUMMARY OF THE INVENTION

It is therefore an object of the present invention to provide a mobile telephone equipment which allows the driver of an automobile to read displayed information and operate push buttons without turning his eyes from a front field of view outside of the front windshield, so that the driver can use the mobile telephone equipment safely while driving the automobile.

According to the present invention, there is provided a mobile telephone equipment for use in an automobile having a front windshield, comprising an antenna for transmitting and receiving radio waves, a main unit having a transmitter, a receiver, and a first controller; the transmitter and the receiver being connected to the antenna; a handset having a speaker, a microphone, and a second controller, the second controller being connected to the speaker, the microphone, and the first controller, further comprising a display unit having a head-up display for displaying communications information and telephone push buttons in a superimposed relation to a front view outside of the front windshield.

The mobile telephone equipment further comprises a touch panel formed on the front windshield in a pattern corresponding to the telephone push buttons which are displayed in a superimposed relation to the front view outside of the front windshield by the head-up display.

The touch panel includes transparent electrodes which may be of indium oxide or tin oxide disposed on the front windshield.

The display unit has a light-emitting display element which may comprise a vacuum fluorescent display, or a cathode-ray tube. Alternatively, the display unit may have a display element which is capable of transmitting light when illuminated by a light source, such as a liquid crystal display.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 1(*b*) is a schematic side elevational view of an automobile, showing the head-up display incorporated in the automobile;

FIG. 2(*b*) is a view showing another displayed image representing communications information;

DETAILED DESCRIPTION OF THE PREFERRED EMBODIMENT

Figure 1A:
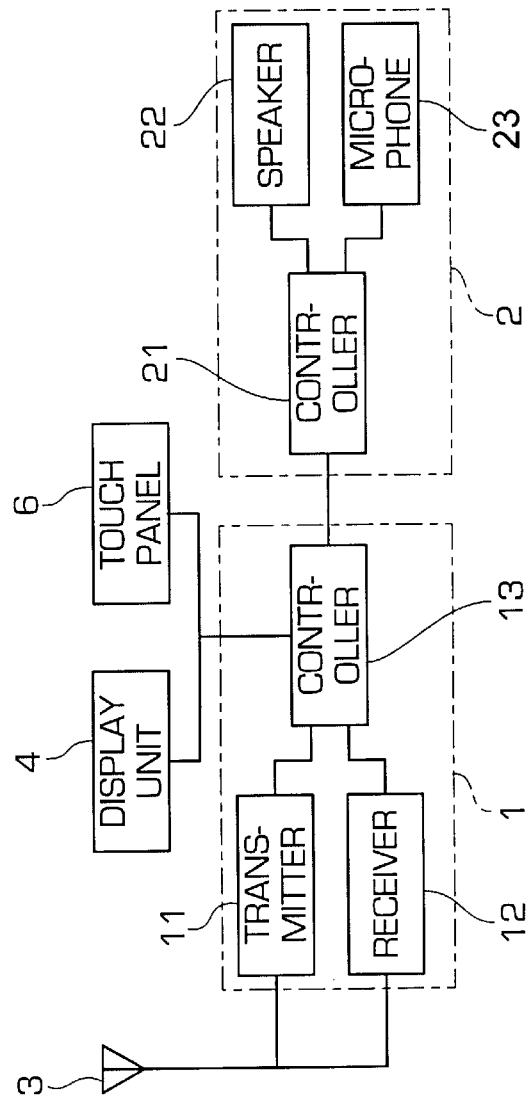
FIG. 1(*a*) is a block diagram of a mobile telephone equipment having a head-up display according to the present invention.
Figure 1B:
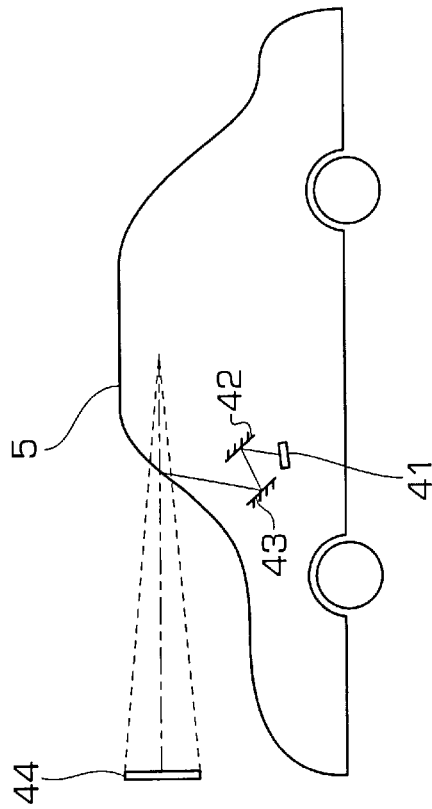
Figure 4:
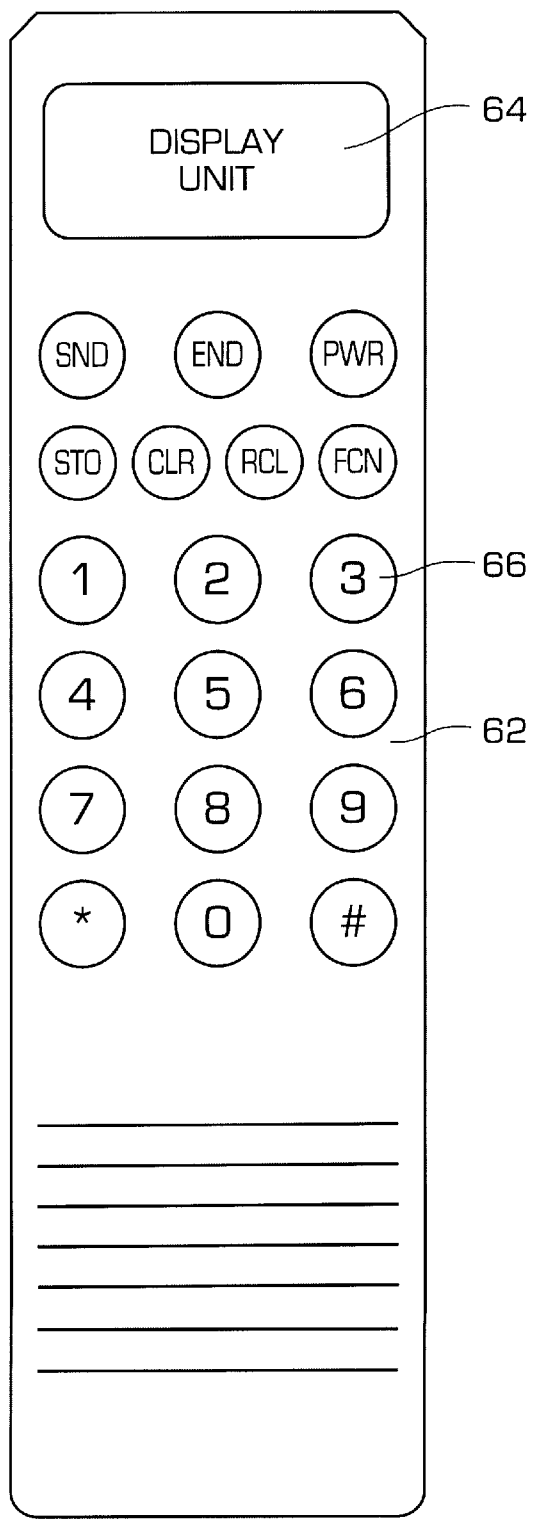
FIG. 4 is a view of a handset for use with a conventional mobile telephone equipment.

As shown in FIG. 1(*a*), a mobile telephone equipment having a head-up display according to the present invention comprises a main unit 1 composed of a transmitter 11, a receiver 12, and a controller 13; a handset 2 composed of a controller 21, a speaker 22, and a microphone 23; an antenna 3 connected to the transmitter 11 and the receiver 12; a display unit 4, and a touch panel 6. The controller 13 is connected to the transmitter 11 and the receiver 12. The controller 21 is connected to the speaker 22, the microphone 23, and the controller 13. The display unit 4 is controlled by the controller 13 for displaying necessary communications information with the head-up display. The touch panel 6 is formed on a front windshield 5 (see FIG. 1(*b*)) of a automobile which incorporates the mobile telephone equipment, and is connected to the controller 13. The touch panel 6 can be used to make a call in the same manner as push buttons (see FIG. 4) on the handset 2.

As shown in FIG. 1(*b*), the head-up display includes an optical system including mirrors 42 and 43 for directing information that is displayed by a light-emitting display element 41 of the display unit 4 toward the front windshield 5, which forms a virtual image 44 that can be viewed as superimposed on the front view outside of the front windshield 5 by the driver of the automobile. The light-emitting display element 41 may be a vacuum fluorescent display (VFD), a liquid crystal display (LCD) device, or a cathode-ray tube (CRT). The head-up display can display communications information and push buttons as the virtual image 44 in a superimposed relation to the front view outside of the front windshield 5. A call can be made through the touch panel 6 on the front windshield 5 in the same manner as the push buttons on the handset 2.

Figure 2A:
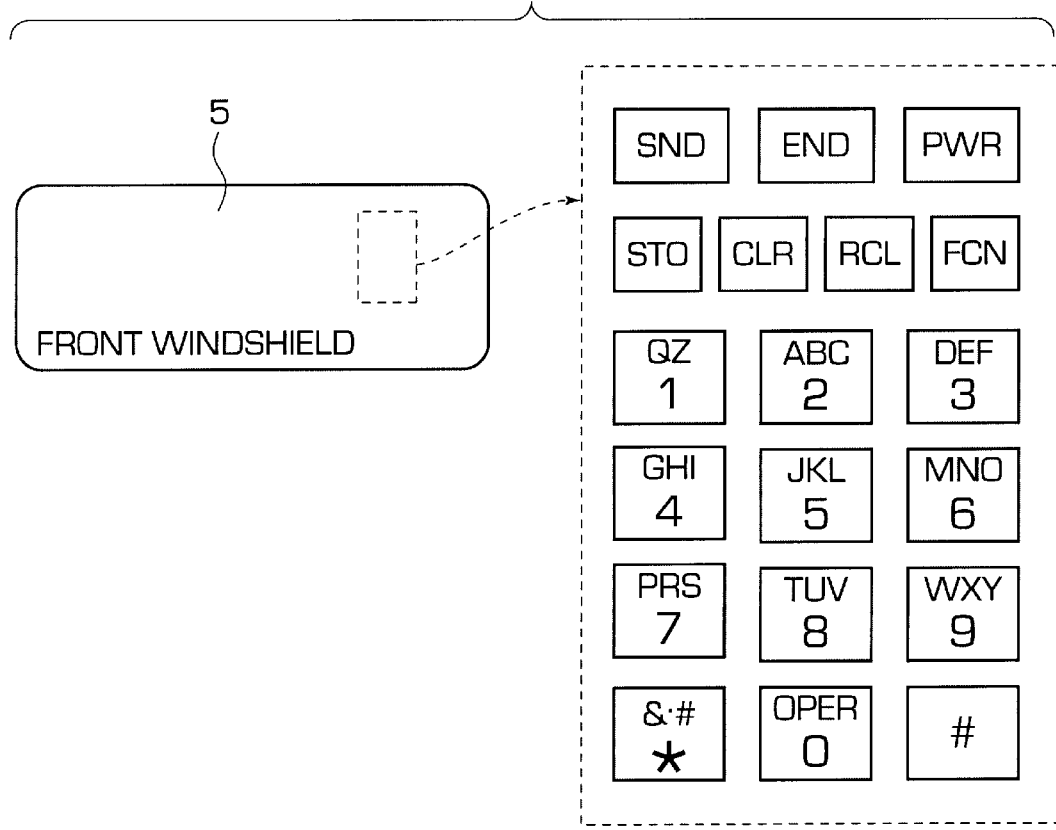
FIG. 2(*a*) is a view showing a displayed image representing telephone push buttons.
Figure 2B:
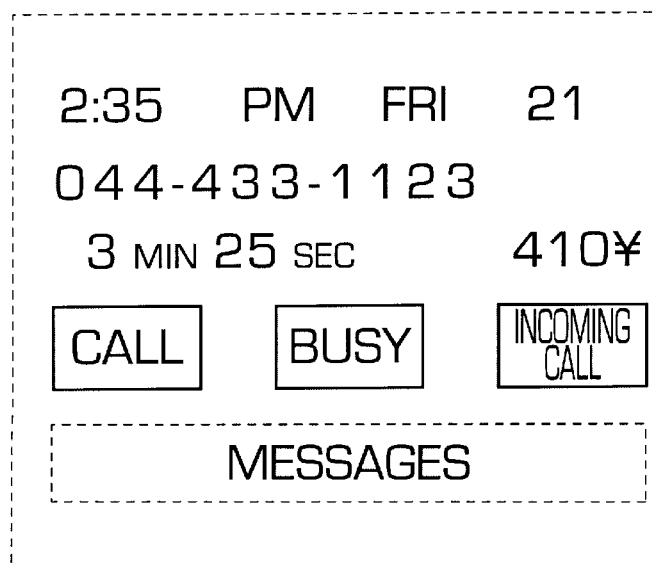

FIGS. 2(a) and 2(b) show, by way of example, respective images displayed by the head-up display.

The displayed image shown in FIG. 2(a) represents telephone push buttons. The displayed telephone push buttons shown in FIG. 2(a) are displayed as a virtual image outside of the front windshield 5. The touch panel 6 (see FIG. 3) is formed on the front windshield 5 in a pattern corresponding to the displayed telephone push buttons. The driver of the automobile can access and operate the touch panel 6 based on the telephone push buttons displayed by the head-up display to make a call, without operating the push buttons on the handset 2. Therefore, the driver is not required to turn his eyes from the front view through the front windshield 5, and hence can drive the automobile safely while making a call. A positional deviation of the telephone push buttons displayed by the head-up display from the touch panel 6 on the front windshield 5 poses no problem insofar as the driver has his viewpoint in an ordinary range. However, to avoid any problems which may be caused when the viewpoint of the driver differs widely from the ordinary range, the front windshield 5 may be marked with a symbol which will not obstruct the driver's view, e.g., dots on the respective four corners of the touch panel 6.

The displayed image shown in FIG. 2(b) represents communications information. The displayed communications information shown in FIG. 2(b) is also displayed as a virtual image. When no call is placed, the displayed image represents driving information including the speed of travel of the automobile, the distance traveled by the automobile, the time, and so on. When a call is placed, the displayed image represents information or messages relative to the call, e.g., incoming call information, information as to a party to which the mobile telephone equipment is connected, i.e., the telephone number of the party, whether the call is being made or the line is busy, the period of time during which the call has continued, the charge for the call, the condition of the radio waves, and so on. Since the displayed communications information is displayed as a virtual image in the front field of view, the driver can see the displayed messages without moving the line of vision or adjusting the focus of eye sight while driving the automobile.

Figure 3:
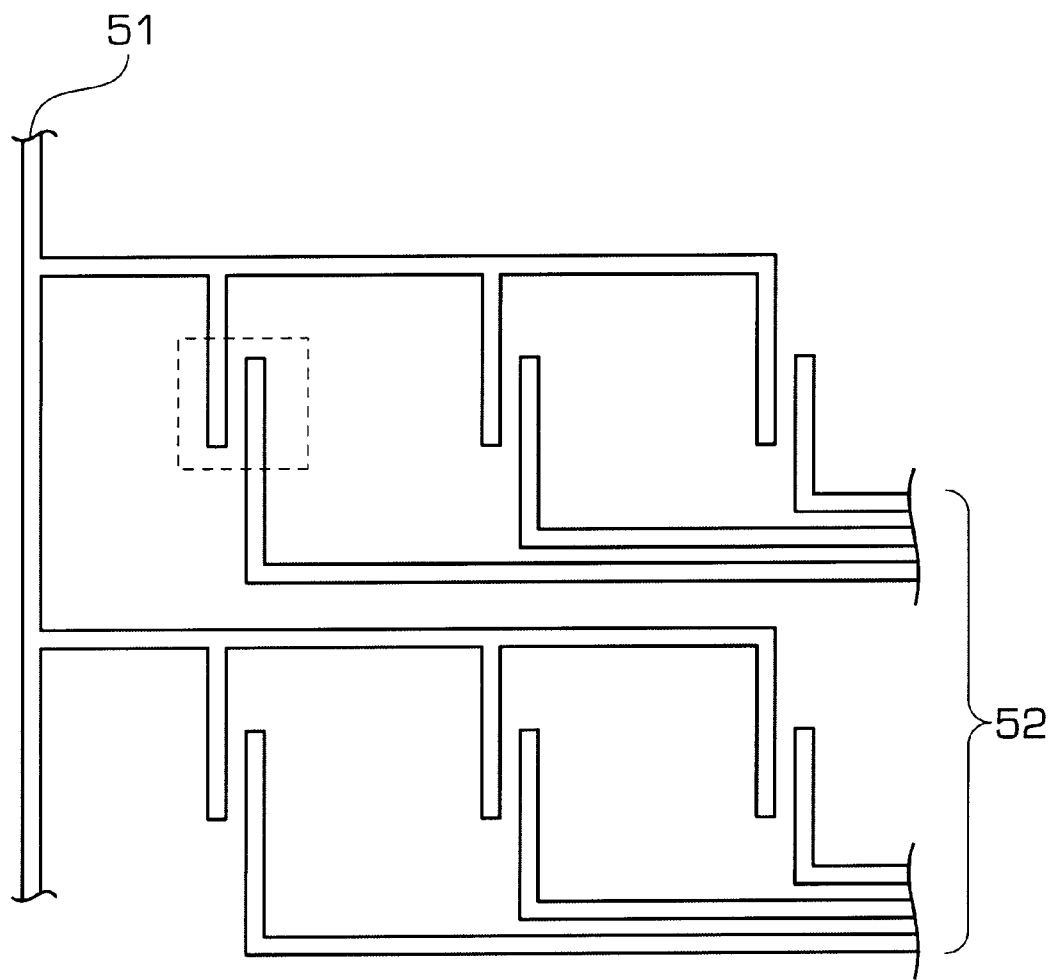
FIG. 3 is a fragmentary view of a structure of a touch panel formed on a front windshield in a pattern corresponding to telephone push buttons displayed by the head-up display.

FIG. 3 fragmentarily shows a structure of the touch panel 6 formed on the front windshield 5 in a pattern corresponding to the displayed push buttons. The touch panel 6 comprises transparent electrodes such as of ITO (indium oxide) or Nesa electrodes such as of tin oxide which do not obstruct the vision of the driver. Specifically, the electrodes include common electrodes 51 and segment electrodes 52 corresponding to the respective displayed push buttons. The electrodes 51, 52 are spaced a distance of about 1 mm from each other and form electrostatic capacitances therebetween. Desired displayed push buttons can be selected by detecting a change in the electrostatic capacitances which is caused by a touch of the driver's finger.

Since the mobile telephone equipment with a head-up display according to the present invention has a wide display area in the front view outside of the front windshield, the display area is not limited by the handset, but large enough to display a sufficient amount of information with good visibility. The driver of the automobile is not required to turn his eyes from the front view in order to see the displayed information while driving the automobile. Since the displayed information is visible in the front view outside of the front windshield, any inconveniences or dangers which the driver would otherwise experience when turning his eyes from the front view in order to see the displayed information are eliminated. Inasmuch as the touch panel is positioned to provide a function of push buttons in the front view outside of the front windshield, the touch panel can be operated efficiently with ease, and allows the driver to make a call while seeing the front view and driving the automobile. Therefore, the driver can drive the automobile much more safely even when he is using the mobile telephone equipment.

Although a certain preferred embodiment of the present invention has been shown and described in detail, it should be understood that various changes and modifications may be made therein without departing from the scope of the appended claims.

What is claimed is:

1. A mobile telephone equipment for use in an automobile having a front windshield, comprising:

an antenna for transmitting and receiving radio waves;

a main unit having a transmitter, a receiver, and a first controller, said transmitter and said receiver being connected to said antenna;

a handset having a speaker, a microphone, and a second controller, said second controller being connected to said speaker, said microphone, and said first controller;

a display unit having a head-up display for displaying communications information and telephones push buttons in a superimposed relation to a front view outside of the front windshield; and a transparent touch panel formed on the front windshield in a pattern corresponding to the displayed telephone push buttons.

2. A mobile telephone equipment according to claim 1, wherein said display unit has a light-emitting display element which comprises a vacuum fluorescent display.

3. A mobile telephone equipment according to claim 1, wherein said display unit has a display element which comprises a liquid crystal display.

4. A mobile telephone equipment according to claim 1, wherein said display unit has a light-emitting display element which comprises a cathode-ray tube.

5. A mobile telephone equipment according to claim 1, wherein the display unit is operable for displaying on the head-up display a symbol marking the location of the touch panel so as not to obscure the front view when a driver's viewpoint differs widely from an ordinary range.

6. A mobile telephone equipment according to claim 1, wherein said transparent touch panel includes transparent electrodes of ITO (indium oxide) disposed on said front windshield.

7. A mobile telephone equipment according to claim 1, wherein said transparent touch panel includes transparent electrodes of Nesa (tin oxide) disposed on said front windshield.

* * * * *